United States Patent [19]

Shimazaki

[11] 4,337,169
[45] Jun. 29, 1982

[54] PROCESS FOR PRODUCING MICROCAPSULES

[75] Inventor: Tetsuro Shimazaki, Takasago, Japan

[73] Assignee: Mitsubishi Paper Mills, Ltd., Tokyo, Japan

[21] Appl. No.: 152,311

[22] Filed: May 22, 1980

[30] Foreign Application Priority Data

May 29, 1979 [JP] Japan .................................. 54-66502

[51] Int. Cl.$^3$ .............................................. B01J 13/02
[52] U.S. Cl. ........................................ 252/316; 8/597; 424/32; 427/151; 427/152; 428/320.6
[58] Field of Search ............................ 252/316; 8/597; 427/151, 152

[56] References Cited

U.S. PATENT DOCUMENTS 3,607,776 9/1971 Santo et al. ........................ 252/316
3,804,776 4/1974 Yazawa et al. .................... 252/316
4,001,140 1/1977 Foris et al. ......................... 252/316

FOREIGN PATENT DOCUMENTS 48-20705 6/1973 Japan .................................. 252/316

OTHER PUBLICATIONS

Fieser et al.: "Organic Chemistry", 3rd Edition, Reinhold Publ. Corp., New York, 1956, pp. 419 and 420.

*Primary Examiner*—Richard D. Lovering
*Attorney, Agent, or Firm*—Cushman, Darby & Cushman

[57] ABSTRACT

In the process for microencapsulating a hydrophobic color forming substance from an aqueous emulsion thereof with membrane forming materials including an aromatic hydroxy compound, urea and formaldehyde, when the polymerization of the components, is carried out in the presence of an amino acid the resulting microcapsules give a self-contained pressure sensitive recording paper having almost no stain.

14 Claims, No Drawings

PROCESS FOR PRODUCING MICROCAPSULES

This invention relates to a process for producing microcapsules and, more particularly, to an improvement in the process which employs an aromatic hydroxy compound as a membrane-forming precursor in producing microcapsules.

The process of this invention is useful in manufacturing microcapsules with reduced discoloration when the capsules contain a dye or a precursor thereof.

Various procedures have heretofore been proposed to answer the purpose of particular use of microcapsules. Among those which are in actual use on large scales, the following processes are comparatively well known.

(1) A process in which phase separation is caused to take place in an aqueous phase containing a dissolved polymer by changing various physicochemical conditions or by other means to enwrap a dispersed phase with the separated phase rich in polymer content (U.S. Pat. Nos. 2,800,457 and 2,800,458).

(2) A process in which a dispersed particles are enwrapped with a polymerizate formed on the surface of dispersed particles from substance A having a large affinity for the dispersed particles and a small affinity for the dispersion medium and substance B having a large affinity for the dispersion medium and a small affinity for the dispersed particles (Japanese Patent Publication Nos. 446/67, 2,882/67 and 2,883/67).

(3) A process in which the dispersed particles are enwrapped with polymerizate or by agglomeration, at the interface between minutely dispersed liquid particles and the dispersion medium, from a substance supplied by either of the dispersed particles or the dispersion medium (Japanese Patent Publication Nos. 9,168/61 and 23,165/72; Japanese Patent Application Laid-open Nos. 57,892/73, 9,079/76, 25,277/79, etc.).

Each of the three groups of processes has been applied to various fields where the particular process would be most advantageously employed. The processes classified in the third group have a number of advantages over those of the first and second groups in that the ratio between the dispersed phase (particles) and the dispersion medium can be selected more freely from a broader range as compared with processes of the first group; the thickness and strength of the membrane can be selected more freely as compared with the processes of the first and second groups; and the proportions of residual microcapsule wall materials and residual microcapsule wall-forming precursor components in the dispersed phase or dispersion medium are smaller than those in the second group processes.

Owing to the advantages enumerated above, the third group processes will be employed more and more widely.

On the other hand, the field where microcapsules are most frequently used is that of carbonless copying paper. This copying paper generally utilizes the color-forming reaction between an electron donating organic color former and an electron accepting color developer. Either or both of the color former and the color developer are encapsulated in microcapsules which are ruptured on application of a pressure to allow the color former and the color developer to contact with each other, resulting in the formation of a colored image.

However, when microcapsules containing an electron donating color former are manufactured by the processes disclosed in Japanese Patent Application Laid-open Nos. 57,892/73, 9,079/76, 84,882/78 and 84,883/78 and in Japanese Patent Application No. 081,793/78 of the present inventors, all of which are classified in the third group, discoloration of the microcapsule dispersion is observed owing probably to the presence of an aromatic polyol which is relatively closely related to the electron accepting color developer. Consequently, difficulties are encountered in printing on or coloring the surface coated with such a dispersion of microcapsules containing an electron donating color former. Although it is possible to decrease the discoloration in manufacturing microcapsules containing an electron donating color former by increasing pH during the manufacture or by decreasing the amount of aromatic polyol, yet it is frequently undesirable in view of the strength and the yield of microcapsules beyond a certain limit.

This invention has been accomplished based on the finding that in a process for producing microcapsules employing an aromatic hydroxy compound as the membrane-forming precursor component, the discoloration can be markedly reduced by the addition of an amino acid. This improved process of this invention is very useful for the reduction of discoloration in manufacturing microcapsules containing an electron donating color former by the microcapsule producing process which employs an aromatic hydroxy compound as a membrane-forming precursor component.

A number of processes have been proposed for producing microcapsules containing an electron donating color former by employing an aromatic hydroxy compound as the membrane-forming precursor component. Japanese Patent Application Laid-open No. 9,079/76 has disclosed as an example the following procedure: A mixture comprising 100 g of a 10% aqueous solution of a hydrolyzate of an ethylene-maleic anhydride copolymer, 10 g of urea, 1 g of resorcinol (benzenediol) and 200 g of water is adjusted to pH 3.5; into said mixture is emulsified 200 ml of a solvent mixture of a hydrocarbon oil having a comparatively high boiling point of 200° to 260° C. and benzylated ethylbenzene containing 3,3-bis(1-ethyl-2-methylindol-3-yl)phthalide and 3,3-bis(4-dimethylaminophenyl)-6-dimethylaminophthalide (commonly called crystal violet lactone) dissolved therein; and, after adding 25 g of 37% formalin, the mixture is kept at 55° C. for 2 hours to produce microcapsules. Japanese Patent Application Laid-open (Kokai) No. 8,856/80 of the present inventors has disclosed as an example the following procedure: 200 g of a 1-phenyl-xylylethane solution containing 3,3-bis-(4-dimethylaminophenyl)-6-dimethylaminophthalide and an aqueous solution containing 5% of hydroxyethylcellulose and 9% of oxalic acid dissolved therein, which has been adjusted to pH 3.5 with sodium hydroxide, are mixed to form an emulsion and, after adding an aqueous solution containing 10 g of urea and 2 g of resorcinol in 100 g of water and 25 g of 35% formalin, the mixture is kept at 60° C. for one hour to obtain microcapsules.

It has been disclosed in Japanese Patent Application Laid-open (Kokai) No. 8,856/80 of the present inventors that the addition of aromatic polyols (a group of aromatic hydroxy compounds) is effective in keeping the viscosity of capsule dispersion at a low level and in improving the membrane strength and that phenolic compounds also show similar effects. The present inventors found that such effects of monols (aromatic monohydroxy compounds), diols (aromatic dihydroxy compounds) and triols (aromatic trihydroxy compounds) increase in the order indicated. However, in the case of microcapsules containing an electron donating color former, the discoloration during the preparation of microcapsules increases also in the above-noted order. Consequently, it is very important for some uses to reduce the discoloration in preparing microcapsules containing an electron donating color former by the process involving the step of adding formaldehyde and at least one aromatic monohydroxy, dihydroxy, or trihydroxy compound which is commonly used as membrane-forming precursor component.

The technique of preventing the discoloration according to this invention may be used in a process for producing microcapsules by adding resorcinol and formaldehyde in the presence of polyvinyl alcohol as the dispersant, as described in Japanese Patent Application Laid-open No. 57,892/73. However, when microcapsules containing an electron donating color former are prepared by the above prior process, not only the discoloration of said capsules becomes pronounced but also other microcapsules containing no electron donating color former are also discolored. Consequently, in such a case, discoloration can not be sufficiently reduced even by the process of this invention.

On the other hand, when microcapsules containing an electron donating color former are prepared by a process involving polycondensation of urea and formaldehyde with the addition of an aromatic hydroxy compound, microcapsules containing no electron donating color former are not discolored while only the microcapsules containing an electron donating color former become discolored. In such a case, the technique of this invention is particularly effective.

As described in Japanese Patent Application Laid-open No. 9,079/76, Japanese Patent Application Laid-open (Kokai) No. 8,856/80 (to present inventors), etc., in a process for producing microcapsules involving the addition of aromatic hydroxy compounds, a suitable emulsifier is used to disperse the capsule core substance. Emulsifiers are generally classified into cationic, anionic, amphoteric and nonionic types.

The microencapsulation processes, wherein the technique of this invention is most effectively utilized, involve the polymer formation using an aromatic hydroxy compound. Processes involving the addition of an already polymerized resin produce less discolored microcapsules even containing an electron donating color former. The advantages of this invention are satisfactorily manifested in the former microencapsulation process involving the polymer formation by the use of an aromatic hydroxy compound, in which an anionic or nonionic emulsifier is comparatively stable, that is, a process for producing microcapsules with the addition of an aromatic hydroxy compound, which involves emulsification with at least one of the anionic and nonionic emulsifiers.

The procedure of encapsulation according to this invention is described below. It should be understood that many modifications of the procedure may be made without departing from the nature and principle of this invention, on condition that after the addition of an amino acid microencapsulation is effected in the presence of an aromatic hydroxy compound.

The process of this invention is carried out essentially in the following manner: A hydrophobic substance is emulsified in an aqueous phase which does not substantially dissolve said substance and which contains one or more anionic or nonionic emulsifiers dissolved therein, and microencapsulation is effected by the reaction of urea, one or more aromatic hydroxy compounds, and one or more amino acids with formaldehyde.

The order and the time of addition of urea, one or more aromatic hydroxy compounds, and one or more amino acids are subject to no particular restriction. When an anionic emulsifier is used, it is common practice to dissolve urea in water prior to or simultaneously with the dissolution of emulsifier; formaldehyde is usually added thereafter. Amino acids can be added before emulsification or after the initiation of encapsulation to exhibit their effect of reducing discoloration.

The emulsifiers for use may be either anionic or nonionic and either natural or synthetic products. Anionic emulsifiers include high molecular anionics such as maleic anhydride copolymers (including hydrolysis products), acrylic acid (and methacrylic acid) polymers and copolymers, vinylbenzene sulfonate polymers and copolymers, carboxymodified celluloses; carboxylates; sulfates, sulfonates and phosphates of aliphatic or higher alcohols or aromatics. These are used each alone or in combinations.

Suitable nonionic emulsifiers include high molecular nonionics such as vinyl acetate polymers and copolymers (including hydrolyzed products), polysaccharides and modified polysaccharides; other nonionics such as polyoxyethylene alkyl ethers, polyoxyethylene alkylphenyl ethers, polyoxyethylene alkyl esters, sorbitan alkyl esters, polyoxyethylene sorbitan alkyl esters, and the like. These are used each alone or in mixtures. If necessary, combinations of anionic emulsifiers with nonionic emulsifiers may also be used.

The hydrophobic substances used in this invention which are substantially insoluble in an aqueous phase containing an emulsifier dissolved therein are vegetable oils such as soybean oil and rapeseed oil, animal oils such as whale oil, mineral oils such as benzene, xylene and paraffin, and synthetic oils such as chlorinated paraffins, dibutyl phthalate and dioctyl adipate. Other hydrophobic substances containing water and those capable of forming dispersed droplets may also be used whether they are liquid or solid at ordinary temperature.

The substances effective in reducing the discoloration are common amino acids and those having an amino or imino group and a carboxyl group in the same molecule, even if not commonly called amino acid. Such substances include, for example, DL-isoserine, L-isoleucine, iminodiacetic acid, oxanilic acid, L-oxyglutamic acid, L-ornithine, glycocyamine, glycylglycine, glycine, L-glutamine, L-glutamic acid, creatine, sarcosine, diaminobenzoic acid, cysteine, l-cineolic acid, α-camphoramic acid, L-thyroxine, 2,3,5-triaminobenzoic acid, L-tryptophan, L-threonine, L-norleucine, hippuric acid, L-valine, pantothenic acid, phenylalanine, phthalamic acid, N-phenylglycine, L-proline, L-asparagic acid, anthranilic acid, valine, aminovaleric acid, aminocinnamic acid, aminobutyric acid, alanine, allanturic acid, L-arginine, alloxantic acid, L-methionine, L-lysine, DL-leucylglycine, and leucine. Accordingly, the term "amino acids", as herein referred to, means a group of compounds having an amino or imino group and a carboxyl group in the molecule. When these amino acids are added after the commencement of encapsulation, the discoloration is not sufficiently reduced, though they exert no substantial effect on the progress of encapsulation. On the other hand, when amino acids are added before the initiation of encapsulation, the viscosity of microcapsule dispersion increases, in some cases, with the progress of encapsulation. The increase in viscosity is undesirable in most of the cases. The degree of viscosity increase depends upon the type of amino acid and tends to become larger with the increase in the ratio of the number of amino groups to the number of carboxyl groups in the molecule. Since the discoloration is reduced more easily by adding an amino acid prior to the commencement of encapsulation than by adding at a later stage, it is advantageous to select an amino acid of the adequate type.

Of the aromatic hydroxy compounds, aromatic monohydroxy compounds include a large number of compounds such as acetamidophenol, anilinophenol, anol, aminocresol, salicylic acid, aminonitrophenol, isoeugenol, eugenol, aminophenol, aminophenolsulfonic acid, isovanillin, isovanillic acid, urushiol, ethylphenol, carvacrol, xylenol, guaiacol, cresol, creosol, chavibetol, chloronitrophenol, chlorophenol, salicyclic acid derivatives, diaminophenol, coniferyl alcohol, nitrophenol, (dimethylamino)phenol, dimethoxyphenol, thymol, tyramine, triaminophenol, trimethylphenol, aminosalicylic acid, vanillin, hydroxyisophthalic acid, hydroxycinnamic acid, hydroxyphthalic acid, hydroxytoluic acid, phenol, (methylamino)phenol and methoxyphenol. Of these monohydroxy compounds those which give particularly good results are phenol, xylenol, aminophenol, methoxyphenol, dimethoxyphenol, diaminophenol, and triaminophenol. Aromatic dihydroxy compounds include also many compounds such as orcinol, catechol, xylenediol, dihydroxybenzoic acid, 4,6-dihydroxy-o-toluic acid, hydroquinone, nitroresorcinol, methylresorcinol, and resorcinol. Among these, orcinol, catechol, 2,6-dihydroxybenzoic acid, 2,4-dihydroxybenzoic acid, and 3,5-dihydroxybenzoic acid give particularly good results. Aromatic trihydroxy compounds include phloroglucin, trihydroxybenzoic acid and hydroxyhydroquinone. Of these, phloroglucin, gallic acid and pyrogallol give particularly good results.

As described before, this invention is very effective to reduce the discoloration which occurs in microencapsulating electron donating color former for use in carbonless copying paper or the like. Such electron donating color formers which develop color on contact with suitable electron accepting color developers are widely known and any of them can be used without any particular restriction. Typical Examples of a large number of known color formers include triarylmethane color formers such as 3,3-bis(p-dimethylaminophenyl)-6-dimethylaminophthalide (generally called crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(9-ethylcarbazol-3-yl)-5-dimethylaminophthalide, etc.; dimethylmethane color formers such as 4,4'-bisdimethylaminobenzhydrin benzyl ether, N-halophenyl leuco auramine, N-2,4,5-trichlorophenyl leuco auramine, etc.; xanthene color formers such as rhodamine B anilinolactam, 3-dimethylamino-7-methoxyfluorane, 3-diethylamino-7-chlorofluorane, 3-diethylamino-6,8-dimethylfluorane, 3-diethylamino-7-methylaminofluorane, 3,7-diethylaminofluorane, 3-diethylamino-7-dibenzylaminofluorane, 3-diethylaminochloroethylmethylaminofluorane, etc.; thiazine color formers such as benzoyl leuco methylene blue, p-nitrobenzyl leuco methylene blue, etc.; and spiro color formers such as 3-methylspirodinaphthopyrane, 3-ethylspirodinaphthopyrane, 3,3'-dichlorospirodinaphthopyrane, 3-propylspirodibenzopyrane, etc. These may be used each alone or in combinations.

Examples of known electron accepting color developers which form a color image on reacting with the above color formers are inorganic acidic substances such as acid clay, activated acid clay, attapulgite, kaolin, aluminum silicate, etc.; phenolic color developers such as various alkylphenols, 4,4'-(1-methylethylidene)-bisphenol, phenol-aldehyde polycondensates, etc.; aromatic carboxylic acid color developers such as benzoic acid, chlorobenzoic acid, toluic acid, salicylic acid, 5-tert-butylsalicylic acid, 3,5-di-tert-butyl-salicylic acid, 3,5-di-(α-methylbenzyl)salicylic acid, etc.; and aromatic carboxylic acid metal salt color developers such as salts of said aromatic carboxylic acids with copper, lead, magnesium, calcium, zinc, aluminum, tin, nickel, etc. These may also be used each alone or in combinations.

Microcapsules in various particle sizes can be manufactured by the present process in accordance with the purpose of use, but it is convenient for the process to make microcapsules having a particle size in the range of substantially from 0.5 to 1,000 μm. The microcapsules can be used either in the form of slurry in the dispersion medium used as manufacturing vehicle or in solid particle form prepared by evaporating or filtering the microcapsule dispersion and removing the emulsifier by filtration, leaching or precipitation. It is also possible to manufacture microcapsules containing as the core materials various dyes, adhesives, liquid crystals, coating compositions, pigments, pharmaceuticals, agricultural chemicals, perfumers, etc., which have been dissolved in or mixed with suitable solvents. These microcapsules are used as materials which respond to pressure, temperature, static electricity, magnetism, or time.

In manufacturing microcapsules, any of the known processes which employ aromatic hydroxy compounds can be used so long as an amino acid is added. The weight ratio of the aqueous phase (manufacturing vehicle) to the solvent (to be enwrapped with capsule walls) substantially insoluble in the aqueous phase is preferably from 20:3 to 1:3, most preferably from 7:3 to 2:3. The weight ratio of the solvent enwrapped with microcapsule walls to the aromatic hydroxy compound is preferably from 300:1 to 5:1, most preferably from 200:1 to 50:1. The weight ratio of the solvent enwrapped with capsule walls to urea is preferably from 100:1 to 5:1, most preferably from 30:1 to 5:1. The molar ratio of the sum of aromatic hydroxy compound and urea to formaldehyde is preferably from 5:4 to 1:4, most preferably from 5:6 to 1:3. The weight ratio of the aromatic monol or polyol to the amino acid is preferably from 4:1 to 1:8, most preferably from 2:1 to 1:4. After the addition of an amino acid, the reactant mixture is kept throughout the encapsulation at a temperature of preferably from 40° to 95° C., most preferably from 45° to 70° C. The pH of the reactant mixture is preferably 6 or less, most preferably from 2 to 4.

By way of illustration, but not by way of limitation, Examples of preferred embodiments of this invention are described below.

EXAMPLE 1

To 200 g of a 4.0% (weight) aqueous phenylphosphinic acid solution (adjusted to pH 3.4 with sodium hydroxide) containing 4.5% by weight of polyvinyl alcohol having a polymerization degree of 1,700 and a saponification degree of 98.5%, was added 10 g of urea dissolved in 100 g of water, followed by 2 g of glutamic acid and 6 g of 3,5-dimethylphenol. Into the resulting mixture, was emulsified 200 g of a 1-phenyl-1-xylylethane solution containing 3% by weight of 3-diethylamino-6-methyl-7-anilinofluorane (hereinafter referred to as black dye) to form a dispersion of droplets, 1 to 10 μm in diameter. To the dispersion, was added 30 g of 35% formalin. The dispersion was stirred for 2 hours in a water bath at 60° C. to prepare microcapsules.

To confirm the formation of microcapsules the following tests were performed. A coating composition comprising 10 g of a p-phenylphenol-formaldehyde polycondensate (a mixture of dimer and trimer on an average), 100 g of aluminum hydroxide, 10 g of a styrene-butadiene copolymer (Dow 670 of Asahi Dow Co.), and a suitable amount of water was coated on a sheet of paper at a rate of 10 g (as solids)/m² and dried; then the microcapsule dispersion obtained above was coated over said undercoat at a rate of about 5 g (as solids)/m² and dried. The reflection density was found to be 0.13, as measured by the densitometer ANA-82R of Tokyo Kōden Co. The coated sheet was placed on a table and rubbed vigorously with a stainless steel rod, 5 mm in diameter. After 5 minutes, the reflection density was found to be 0.47, indicating that black dye and 1-phenyl-1-xylylethane were released from ruptured microcapsules and the black dye reacted with the p-phenylphenolformaldehyde polycondensate. Thus, the formation of microcapsules was confirmed. The microcapsule dispersion was examined under an optical microscope at 500-fold magnification and nearly spherical microcapsules with local depression were observed. The dispersion was coated on a sheet of white paper at a rate of 5 g (as solids)/m² and dried. The reflection density was found to be 0.13, as measured by the densitometer ANA-82R of Tokyo Kōden Co., indicating that the discoloration was evidently reduced as compared with the results of a similar test performed in Comparative Example 1 below.

COMPARATIVE EXAMPLE 1

Microcapsules were prepared by repeating the procedure of Example 1, except that no glutamic acid was added. To confirm the formation of microcapsules, the microcapsule dispersion obtained was coated at a rate of about 5 g (as solids)/m² over a sheet of white paper which had been precoated with a p-phenylphenolformaldehyde polycondensate (a mixture of dimer and trimer on an average) in the same manner as in Example 1. After drying, the reflection density of the coated paper was found to be 0.19, as measured by the densitometer ANA-82R of Tokyo Koden Co. The sheet was placed on a table and rubbed vigorously with a stainless steel rod, 5 mm in diameter. After 5 minutes, the reflection density was found to be 0.45, indicating that microcapsules had been formed. The dispersion was examined under an optical microscope at 500-fold magnification and nearly spherical microcapsules with local depression were observed. The dispersion was coated on a sheet of white paper in the same manner as in Example 1. The reflection density was found to be 0.18.

EXAMPLE 2

To 200 g of an aqueous solution (adjusted to pH 3.2 with sodium hydroxide) containing 5% by weight of an ethylene-maleic anhydride copolymer hydrolyzate (EMA 31 of Monsanto Chemical Co.) having a molecular weight of about 75,000 to 90,000, were added 10 g of urea and 5 g of 2,4-dihydroxybenzoic acid. Into the resulting mixture, was emulsified 180 g of a 1-phenyl-1-xylylethane solution containing 1% by weight of 3,3-bis-(4-dimethylaminophenyl)-6-dimethylaminophthalid (generally known as crystal violet lactone) to prepare a dispersion of droplets, 1 to 10 μm in size. After the addition of 30 g of 35% formalin, the mixture was stirred in a water bath at 50° C. After 10 minutes, 1 g of glycine was added and the mixture was kept stirred for 4 hours to form microcapsules.

To confirm the formation of microcapsules, the following tests were performed. A coating composition comprising 10 g of a p-phenylphenol-formaldehyde polycondensate (a mixture of dimer and trimer on an average), 100 g of aluminum hydroxide, 10 g of a styrenebutadiene copolymer (Dow 670 of Asahi Dow Co.) and a suitable amount of water was coated on a sheet of paper at a rate of 10 g (as solids)/m² and dried; then the microcapsule dispersion obtained above was coated over said undercoat at a rate of about 5 g (as solids)/m² and dried. The reflection density was found to be 0.01, as measured by the densitometer ANA-82R with a green filter. The coated sheet placed on a table was rubbed vigorously with a stainless steel rod, 5 mm in diameter. After 5 minutes the reflection density was found to be 0.37, indicating that crystal violet lactone and 1-phenyl-1-xylylethane were released from ruptured microcapsules and the crystal violet lactone reacted with the p-phenylphenol-formaldehyde polycondensate. Thus, the formation of microcapsules was confirmed. The microcapsule dispersion was examined under an optical microscope at 500-fold magnification and nearly spherical microcapsules with local depression were observed.

The microcapsule dispersion was coated on a sheet of white paper at a rate of 5 g (as solids)/m² and dried. The reflection density was found to be 0.01, as measured by the densitometer ANA-81R of Tokyo Kōden Co., indicating that the discoloration was evidently reduced as compared with the results of test performed in Comparative Example 2 below.

COMPARATIVE EXAMPLE 2

Microcapsules were prepared by repeating the procedure of Example 2, except that no glycine was added. To confirm the formation of microcapsules, the microcapsule dispersion was coated on a sheet of paper which had been precoated with a p-phenylphenol-formaldehyde polycondensate (a mixture of dimer and trimer on an average) in the same manner as in Example 2. After drying, the reflection density of the coated paper was found to be 0.03. The sheet placed on a table was rubbed vigorously with a stainless steel rod, 5 mm in diameter. After 5 minutes, the reflection density was found to be 0.33, indicating the formation of microcapsules. The dispersion was examined under an optical microscope at 500-fold magnification and nearly spherical microcapsules with slight depression were observed. The dispersion was coated on a sheet of white paper, as in Example 2. The reflection density was found to be 0.03.

EXAMPLE 3

Microcapsules were prepared by repeating the procedure of Example 1, except that 2 g of phloroglucinol and 1 g of L-leucine were used in place of 6 g of 3,5-dimethylphenol and 2 g of glutamic acid. To confirm the formation of microcapsules, the microcapsule dispersion was coated on a sheet of paper which had been precoated with a p-phenylphenol-formaldehyde polycondensate in the same manner as in Example 1. After drying, the reflection density of the coated sheet was found to be 0.12. The sheet placed on a table was rubbed vigorously with a stainless steel rod, 5 mm in diameter. After 5 minutes, the reflection density was found to be 0.40, indicating that black dye and 1-phenyl-1-xylylethane were released from the ruptured microcapsules and the black dye reacted with the p-phenylphenol-formaldehyde polycondensate. Thus, the formation of microcapsules was confirmed. The microcapsule dispersion was examined under an optical microscope at 500-fold magnification and nearly spherical microcapsules with local depression were observed. The dispersion was coated on a sheet of white paper at a rate of 5 g (as solids)/$m^2$ and dried. The reflection density was found to be 0.12, indicating that the discoloration was evidently reduced as compared with the results of test performed in Comparative Example 3 below.

COMPARATIVE EXAMPLE 3

Microcapsules were prepared by repeating the procedure of Example 3, except that L-leucine was not added. To confirm the formation of microcapsules, the dispersion was coated at a rate of about 5 g (as solids)/$m^2$ on a sheet of paper which had been precoated with a p-phenylphenol-formaldehyde polycondensate (a mixture of dimer and trimer on an average) in the same manner as in Example 3. After drying, the reflection density was found to be 0.19. The coated paper sheet placed on a table was rubbed vigorously with a stainless steel rod, 5 mm in diameter. After 5 minutes, the reflection density was found to be 0.45, confirming that microcapsules were formed.

The microcapsule dispersion was examined under an optical microscope at 500-fold magnification, and microcapsules in nearly spherical form with local depression were observed. The dispersion was coated on a sheet of white paper in the same manner as in Example 3. The reflection density was found to be 0.19.

EXAMPLE 4

To 200 g of a 9.5% (weight) aqueous oxalic acid solution (adjusted to pH 3.2 with sodium hydroxide) containing 5.5% by weight of hydroxyethylcellulose (viscosity of 2% solution at 20° C.: 20-30 cps), was added 11 g of urea dissolved in 100 g of water, followed by 2 g of L-tyrosine and 2 g of orcinol. Into the resulting mixture, was emulsified 150 g of a dioctyl adipate solution containing 3% by weight of black dye to form a dispersion of droplets, about 2 to 20 μm in diameter. After adding 25 g of 35% formalin, the dispersion was stirred for 4 hours in a water bath at 55° C. to prepare microcapsules. To confirm the formation of microcapsules the following tests were performed. A coating composition comprising 10 g of 3,5-di-tert-butylsalicylic acid, 100 g of zinc oxide, 10 g of a styrene-butadiene copolymer (Dow 670 of Asahi Dow Co.), and a suitable amount of water was coated on a sheet of paper at a rate of 10 g (as solids)/$m^2$ and dried. Then, the microcapsule dispersion obtained above was coated over said undercoat at a rate of about 5 g (as solids)/$m^2$ and dried. The reflection density was found to be 0.12, as measured by the densitometer ANA-82R of Tokyo Kōden Co. The coated sheet placed on a table was rubbed vigorously with a stainless steel rod, 5 mm in diameter. After 5 minutes, the reflection density was found to be 0.42, indicating that black dye and dioctyl adipate were released from ruptured microcapsules and the black dye reacted with the 3,5-di-tertbutylsalicylic acid. Thus, the formation of microcapsules was confirmed. The microcapsule dispersion was examined under an optical microscope at 500-fold magnification and nearly spherical microcapsules with local depression were observed. The dispersion was coated on a sheet of white paper at a rate of 5 g (as solids)/$m^2$ and dried. The reflection density was found to be 0.12, indicating that the discoloration was evidently reduced as compared with the result of a similar test performed in Comparative Example 4 below.

COMPARATIVE EXAMPLE 4

Microcapsules were prepared by repeating the procedure of Example 4, except that no L-tyrosine was added. To confirm the formation of microcapsules, the microcapsule dispersion was coated at a rate of about 5 g (as solids)/$m^2$ over a sheet of paper which had been precoated with 3,5-di-tert-butylsalicylic acid in the same manner as in Example 4. After drying, the reflection density of the coated paper was found to be 0.18. The sheet placed on a table was rubbed vigorously with a stainless steel rod. After 5 minutes, the reflection density was found to be 0.45, indicating that microcapsules had been formed. The dispersion was examined under an optical microscope at 500-fold magnification and nearly spherical microcapsules with local depression were observed. The dispersion was coated on a sheet of white paper in the same manner as in Example 1. The reflection density was found to be 0.19.

What is claimed is:

1. A process for producing microcapsules, which comprises emulsifying in an emulsifier-containing aqueous phase a hydrophobic substance substantially insoluble therein, adding as membrane-forming precursor components, at least one aromatic hydroxy compound, urea and formaldehyde, further adding to the system an amino acid having only one amino group as a discoloration reducing agent, the amino acid being present in an amount effective to reduce the discoloration caused by the aromatic hydroxy compound, and allowing said precursor components to polymerize to form a polymerizate membrane at the interphase between said hydrophobic substance and said aqueous phase.

2. A process for producing microcapsules according to claim 1, wherein the emulsifier is anionic or nonionic.

3. A process for producing microcapsules according to claim 2 wherein the hydrophobic substance contains at least one electron donating color former.

4. A process for producing microcapsules according to claim 2 wherein the aromatic compound, urea and formaldehyde are the precursor components, the aromatic hydroxy compound is selected from the group consisting of aromatic monohydroxy compounds, aromatic dihydroxy compounds, and aromatic trihydroxy compounds and the hydrophobic substance contains at least one electron donating color former.

5. A process for producing microcapsules according to claim 2 wherein the amino acid is selected from the group consisting of glutamic acid, glycine, L-leucine and L-tyrosine.

6. A process for producing microcapsules according to claim 2 wherein the aromatic compound, urea and formaldehyde are the precursor components, the aromatic hydroxy compound is selected from the group consisting of aromatic monohydroxy compounds, aromatic dihydroxy compounds, and aromatic trihydroxy compounds and the amino acid is selected from the group consisting of glutamic acid, glycine, L-leucine and L-tyrosine.

7. A process for producing microcapsules according to claim 1, wherein the aromatic hydroxy compound is selected from the group consisting of aromatic monohydroxy compounds, aromatic dihydroxy compounds, and aromatic trihydroxy compounds.

8. A process for producing microcapsules according to claim 1, wherein the hydrophobic substance contains at least one electron donating color former.

9. A process for producing microcapsules according to claim 1, wherein the amino acid is selected from the group consisting of glutamic acid, glycine, L-leucine and L-tyrosine.

10. A process for producing microcapsules according to claim 1 wherein the weight ratio of the aromatic hydroxy compound to the amino acid is from 4:1 to 1:8.

11. A process according to claim 10 wherein the aromatic hydroxy compound is selected from the group consisting of aromatic monohydroxy compounds, aromatic dihydroxy compounds, and aromatic trihydroxy compounds, and the hydrophobic substance contains at least one electron donating color former.

12. A process according to claim 11 wherein the amino acid is selected from the group consisting of glutamic acid, glycine, L-leucine, and L-tyrosine.

13. A process according to claim 10 wherein the weight ratio of the aromatic hydroxy compound to the amino acid is from 2:1 to 1:4.

14. A process according to claim 1 wherein the membrane-forming precursor components consist of the aromatic hydroxy compound, urea, and formaldehyde.

* * * * *